Figure 1:
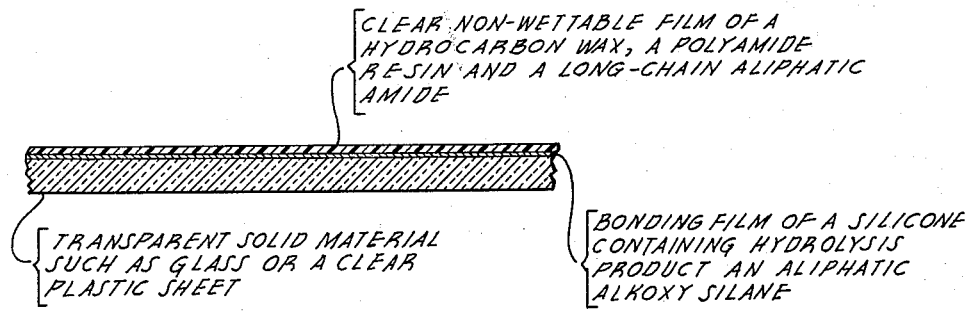

Nov. 29, 1960  J. M. FAIN ET AL  2,962,390
RAIN REPELLENT COMPOSITIONS, METHOD OF
APPLICATION AND BASE COATED THEREWITH
Filed Aug. 18, 1955

INVENTORS.
JACOB M. FAIN
EDWARD E. McDONNELL
SOL MILLER

ATTORNEY.

United States Patent Office 2,962,390
Patented Nov. 29, 1960

2,962,390
RAIN REPELLENT COMPOSITIONS, METHOD OF APPLICATION AND BASE COATED THEREWITH

Jacob M. Fain and Edward E. McDonnell, Brooklyn, and Sol Miller, Bronx, N.Y.

Filed Aug. 18, 1955, Ser. No. 529,318
12 Claims. (Cl. 117—64)

This invention relates to compositions and to the method for their application to the surfaces of glass and other transparent materials to render them non-wettable with water.

It is particularly concerned with the problem of rendering windshields, such as those of airplanes, boats, automobiles and locomotives rain-repellent so that clear vision is maintained when they are subjected to rain or water-spray, but is equally useful for the treatment of lenses and other optical surfaces which come into contact with water, such as the lenses of periscopes, binoculars and range finders, and similar optical equipment.

The reduction in visibility caused by rain beating on the windshields of aircraft is a major difficulty, particularly in the case of jet aircraft, since the speeds at which such aircraft travel makes impractical the use of mechanical windshield wipers. It has heretofore been recognized that the treatment of the outer surface of the windshield to render it non-wettable by water is a practical solution to the problem, since water contacting the non-wettable surface breaks up into droplets which are blown off by the wind stream passing over the surface.

Coating and methods for their application have heretofore been developed to render glass surfaces non-wettable. However, the coatings and methods for their application which have heretofore been developed have had disadvantages of one type or another arising from the severe requirements imposed upon them. Important requirements for such coatings are:

(1) They must be optically clear and not produce objectionable glare under varying conditions of light intensity.

(2) They must shed water in droplets of a size which will not interfere with vision.

(3) They must have a satisfactorily longlife in service both when moving at high speeds in heavy rain storms and when exposed in dry weather to the light and heat of the sun.

(4) They must not have a deleterious effect on glass or transparent plastic materials, such as those used for aircraft enclosures or on other materials such as those used in the construction of aircraft, including aluminum, aluminum alloys, magnesium alloys, titanium, steel, ferrous alloys and aircraft finishes.

(5) The coatings must not pick up excessive dust or other light-weight particles.

(6) They must be non-inflammable.

(7) The compositions from which the coatings are formed must be of low toxicity and possess good storage stability.

(8) The compositions must be easy and convenient to apply to form the coatings and the time required for their application and formation of the coatings must be relatively short.

Now, it is the object of this invention to provide water-repellant coatings, compositions from which they are formed and a method for their formation which fulfill these severe requirements, and which are particularly advantageous from the standpoint of the ease with which the coating can be applied and the short time required for the formation of a coating which is ready for service. As can readily be appreciated, the time required for the formation of the coating on the windshields of combat aircraft is of great importance.

Other objects of this invention and its various advantageous features will be readily apparent from the detailed disclosure of this invention which follows.

The composition in accordance with this invention, adapted for application to the surface of a transparent solid to render it non-wettable by water, comprises a solid homogeneous mixture of a hydrocarbon wax, a polyamide resin, and a material which causes the hydrocarbon wax and the polyamide resin to blend to a homogeneous mixture. Long-chain aliphatic amides are suitable blending agents for this purpose. This composition is, preferably cast into bars or sticks which can be conveniently held in the hand while being rubbed over the surface of the transparent material which is being treated to render it non-wettable by water.

By the method in accordance with this invention the surface of a transparent material is cleaned of foreign substances, coated with a thin film of a bonding material and then coated with a thin film of the blended hydrocarbon wax-polyamide resin composition. The bonding composition which we apply to produce the intermediate film of bonding material is a substantially anhydrous paste which comprises an admixture of an organo-silicon compound which on hydrolysis forms cross-linked polymers containing —Si—O—Si— groups such as, an aliphatic trialkoxy silane or an aliphatic dialkoxy silane and a finely divided solid. It may contain, in addition, a volatile organic solvent.

The coated product in accordance with this invention comprises a transparent solid material such as, for example, glass or a clear plastic material, such as, Lucite or Plexiglas having a surface carrying a transparent film comprising a homogeneous mixture of a hydrocarbon wax, a polyamide resin, and a long-chain aliphatic amide which is bonded to the said surface by an intermediate film of a hydrolyzed aliphatic alkoxy silane.

The function of the hydrocarbon wax in our non-wettable composition is to impart water-repellency to the composition. The wax may be a paraffin wax or a microcrystalline wax. We prefer to use a refined paraffin wax, since compositions containing this wax are easier to rub into a uniform transparent film than those containing a microcrystalline wax. The refined paraffin wax having a melting point within the range of about 123° F. to about 149° F. is suitable for this purpose. Compositions containing the higher melting paraffin waxes are more difficult to rub into a uniform, transparent film than those containing paraffin waxes of lower melting points. However, a refined paraffin wax melting as low as 123° F. has a tendency to cause a film of the composition to be greasy in appearance. We have found that a paraffin wax melting within the range of about 125° F. to about 127° F. gives the most satisfactory results in our composition.

The function of the polyamide resin in this non-wettable composition is to increase its hardness and toughness, with a corresponding increase in the service life of the non-wettable film produced from it. The polyamide resin also makes the composition easier to polish into a thin, clear film and causes the film to be less greasy.

The polyamide resin which we use in this composition is a thermoplastic polymer prepared by the condensation of a polymerized unsaturated fatty acid, such as, for example, dilinoleic acid, with an aliphatic amine such as, ethylene diamine. The chemical composition of a polyamide resin produced by the condensation of dilinoleic acid with ethylene diamine which we may use has the following formula:

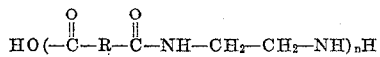

in which $n$ is an integer from about 5 to about 15 and R is the hydrocarbon group of dilinoleic acid.

We prefer to use a polyamide resin having a softening point, as determined by the ball and ring method of the American Society for Testing Materials within the range of about 95° C. and about 115° C. and an average molecular weight within the range of about 3000 to about 6500, and prefer a resin having a softening point within the range of about 105° C. to about 115° C. Polyamide Resin No. 94 produced by General Mills, Inc., is such a resin and is entirely suitable for our purpose.

Polyamide resin is incompatible with mineral wax in binary mixtures, and such binary mixtures are unsuitable for our purposes. We have found, however, that the polyamide resin and the hydrocarbon wax are compatible in the presence of a long-chain aliphatic amide, and such an amide forms an essential ingredient of our nonwettable composition. The aliphatic group of the amide which we use may contain from about 9 to about 32 carbon atoms. Examples of such amides are capryl amide, lauryl amide, myristyl amide, palmityl amide, stearyl amide, oleyl amide, linoleyl amide, linolenyl amide, and hydrogenated tallow amide. Of these various amides, we prefer to use oleyl amide in these compositions.

The non-wettable composition may contain from about 20 percent to about 50 percent, by weight, of a mineral wax, about 20 percent to about 50 percent of a polyamide resin and about 20 percent to about 50 percent of a long-chain aliphatic amide and we prefer a composition containing an amount of each of these essential ingredients within the range of about 30 percent to about 35 percent, by weight.

Figure 2:
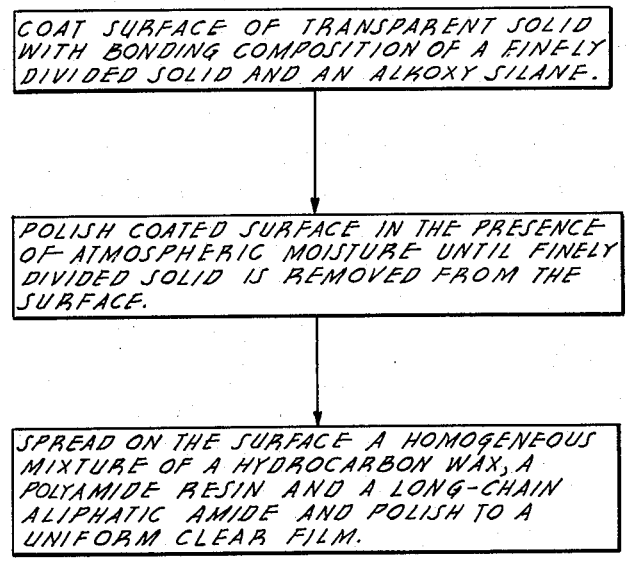

Figure 1 of the drawing is a self-explanatory broken cross-section of the product in accordance with this invention which may be, for example, a glass or a plastic windshield which is rendered non-wettable by the two-layered film illustrated by the figure. In this figure, the relative thicknesses of bonding film and of the outer nonwettable film of a hydrocarbon wax, a polyamide resin and a long-chain aliphatic amide, as compared with the thickness of the sheet of glass or plastic, have been magnified for clarity of illustration. Figure 2 of the drawing is a flow diagram showing the steps of the method of this invention which are used in rendering a transparent surface non-wettable.

A non-wettable composition in accordance with this invention is specifically illustrated by Example I.

EXAMPLE I

*Non-wettable composition*

| | Parts by wt. |
|---|---|
| Paraffin wax | 1 |
| Polyamide resin | 1 |
| Oleyl amide | 1 |

These materials are heated together to form a clear, homogeneous melt. This melt is then poured into moulds adapted for the formation of bars and permitted to cool to ambient temperature. Upon cooling the melt solidifies and the bars are removed from the moulds and are ready for use.

The same method is used for the production of a non-wettable film on the surface of glass or on the surface of a transparent plastic, such as, for example, an acrylic resin. The surface of the transparent material to be coated, if excessively dirty, is first washed with soap and water and dried. It is then further cleaned by wiping it with a soft clean rag, dampened with a volatile, organic solvent, such as, for example, isopropanol or a mixture of mineral spirits and isopropanol in, for example, a 70:30 ratio. The surface is polished with a clean, soft rag until free of the volatile organic solvent, and then completely coated with a thin layer of the bonding composition such as, for example that illustrated by Example II.

EXAMPLE II

*Bonding composition*

| | Parts by wt. |
|---|---|
| Amyl triethoxy silane | 50 |
| Carbon black | 25 |
| Mineral spirits | 25 |

This composition is prepared by uniformly and thoroughly mixing the three ingredients together at room temperature. The resulting mixture has the consistency of a paste. The layer of this paste on the surface being treated is polished until no carbon black pigment is visible on the surface or on the polishing cloth. The solid, non-wettable composition in accordance with this invention is then rubbed completely over the surface, and polished with a clean, soft rag until the film is entirely transparent. In order to recoat the surface this procedure is repeated, although the preliminary washing with soap and water is ordinarily not required.

An aliphatic alkoxy silane, exemplified by amyl triethoxy silane, forms an essential component of this bonding composition. It may be a compound having the general formula:

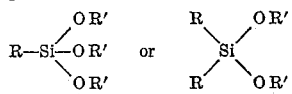

in which R is an alkyl group containing at least three carbon atoms and may contain as many as thirty-two carbon atoms and R' is an alkyl group containing one or more carbon atoms, such as, for example, propyl trimethoxy silane, propyl triethoxy silane, propyl tripropoxy silane, propyl tributoxy silane, butyl trimethoxy silane, butyl triethoxy silane, butyl tripropoxy silane, butyl tributoxy silane, amyl trimethoxy silane, amyl triethoxy silane, amyl tripropoxy silane, amyl tributoxy silane, dipropyl dimethoxy silane, dipropyl diethoxy silane, dipropyl dipropoxy silane, dipropyl dibutoxy silane, dibutyl dimethoxy silane, dibutyl diethoxy silane, dibutyl dipropoxy silane, dibutyl dibutoxy silane, diamyl dimethoxy silane, diamyl diethoxy silane, diamyl dipropoxy silane diamyl dibutoxy silane and the like.

The finely divided solid which we include in this composition must be substantially non-abrasive to a glass or plastic surface and should be substantially completely anhydrous when used in the preparation of the composition. It is preferably one having a dark color and the characteristic of forming a heavy paste when admixed with a relatively large proportion of an organic mixture. Carbon black, rouge, lithopone, and grit-free kaolin may be used for this purpose. Carbon black is a completely satisfactory material for this purpose since it normally contains no free or combined water, it is dark in color, non-abrasive to glass and plastic surfaces, and forms a heavy paste when admixed with a high proportion of an organic liquid.

The volatile organic solvent which we may include in the bonding composition must be anhydrous and be miscible with the alkyl alkoxy silane in the composition. It should have no solvent action or other adverse effect on the transparent surface to which the composition is to be applied. A variety of different classes of solvents may be used in compositions to be applied only to glass surfaces. However, from a practical standpoint, we prefer a bonding composition adapted for application to either a glass surface or a plastic surface, so we prefer to avoid organic solvents which have a solvent action on plastic surfaces and have found that aliphatic hydrocarbon solvents are generally satisfactory in the composition. The solvent should have an evaporation rate which is sufficiently low to permit the composition to be spread uniformly over the area of, for example, an aircraft windshield, before a major portion evaporates from the composition, but still high enough for it to fully evaporate from the composition within a short time after it is spread as a film. Aliphatic hydrocarbon solvents having a boiling range within the range of about 200° F. to about 400° F. have evaporation rates meeting these requirements and we prefer an aliphatic hydrocarbon solvent having a boiling range of about 300° F. to about 385° F. in this composition.

In the treatment of the surface of a transparent solid, we spread the bonding composition over the surface as a thin film and polish the surface with, for example, a soft cloth until none of the solid contained in the composition can be observed either on the surface or on the polishing cloth. In the course of this operation the volatile organic solvent evaporates from the composition and the aliphatic alkoxy silane is hydrolyzed by the moisture of the atmosphere to release alcohol which evaporates from the surface, leaving a silicon containing residue on the surface. We believe that this hydrolysis reaction, in the case of, for example, amyl triethoxy silane is accurately represented by the following equation:

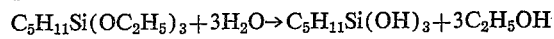

A further reaction is believed to take place according to the following equation:

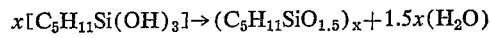

As will be appreciated from these equations, the hydrocarbon group represented by R′ in the generic formula for the aliphatic alkoxy silanes contained in our compositions forms the hydrocarbon group of the alcohol produced by the hydrolysis reaction and is a by-product of the reaction from the standpoint of our purpose. For this reason, the exact number of carbon atoms in R′ alkyl group is generally immaterial, although we prefer that it be a relatively small group which produces a volatile alcohol which evaporates readily from the treated surface.

The silicon-containing residue which is deposited on the transparent surface as a result of the hydrolysis of the aliphatic alkoxy silane in our bonding composition causes the non-wettable, blended mixture of paraffin wax and polyamide resin to adhere strongly to the treated surface. Our explanation for this phenomena is that the silicon-containing residue is deposited on the surface of the transparent material with a definite orientation which causes it to act as a bond between the surface and our non-wettable composition. This silicon-containing residue, as indicated by the second equation given hereinbefore, is believed to be a cross-linked polymer which has polar oxygen groups which adhere to the surface of the transparent material, with its non-polar alkyl groups, represented by R in the generic formula given hereinbefore, extending outwardly. These outwardly extending non-polar groups are believed to adhere strongly to a superimposed film of our non-wettable, blended mixture of a hydrocarbon wax and polyamide resin. As would be expected from this theory of the action of this silicon-containing residue, the alkyl group represented by R in the generic formula of the aliphatic alkoxy silanes contained in our composition is desirably a large group and, as already noted, should contain at least three carbon atoms.

The relative proportions in which the three essential ingredients are present in our composition is determined largely by the particular finely-divided solid included in in the composition, its capacity to form a paste when admixed with the aliphatic alkoxy silane and volatile organic solvent, and the stiffness desired in the resulting paste. We have found that when using carbon black as the finely-divided solid, that the aliphatic alkoxy silane may be present in the composition in amount with the range of about 30 percent to about 80 percent, by weight, the volatile organic solvent within the range of 0 percent to about 50 percent, by weight, and the carbon black within the range of about 20 percent to about 30 percent, by weight. The stiffness of the paste which is produced increases with amount of carbon black or other solid material contained in the composition. We prefer a composition which contains about 45 percent to about 55 percent, by weight, of an aliphatic alkoxy silane, about 24 to about 26 percent, by weight, of carbon black and about 20 to about 30 percent, by weight, of a volatile organic solvent.

Although the coating of the surface of aircraft windshields is stressed in the foregoing because of difficult problems involved, this invention is not limited to the treatment of such surfaces. It is applicable to the treatment of any transparent solid surface and is advantageous wherever rain or water spray interferes with the optical properties of the transparent material.

While we have given specific examples of our new compositions and have exemplified the practice of our method to produce a film on a transparent surface which is non-wettable by water, it will be understood that these examples are for the purpose of illustration and that various modifications and changes can be made from the examples without departing from the spirit of our invention or the scope of the following claims and that while various theories have been given for the purpose of explaining the behavior of the compositions, we do not intend to be bound by these theories.

We claim:

1. A water-repellant composition in the form of a solid, homogeneous mixture adapted for application to the surface of a transparent, solid material comprising a hydrocarbon wax, a polyamide resin having an average molecular weight within the range of about 3000 to about 6000 and a long chain aliphatic amide having an aliphatic group containing from about 9 to about 32 carbon atoms.

2. A water-repellant composition in the form of a solid, homogeneous mixture adapted for application to the surface of a transparent solid material comprising a paraffin wax, a polyamide resin having an average molecular weight within the range of about 3000 to about 6000 and a long chain aliphatic amide having an aliphatic group containing from about 9 to about 32 carbon atoms.

3. A water-repellant composition in the form of a solid, homogeneous mixture adapted for application to the surface of a transparent solid material comprising a refined paraffin wax having a melting point within the range of about 123° F. to about 149° F., a polyamide resin having an average molecular weight within the range of about 3000 to about 6000 having a softening point within the range of about 105° C. to about 115° C. and an aliphatic amide having an aliphatic group containing from about 9 to about 32 carbon atoms.

4. A water-repellant composition in the form of a solid, homogeneous mixture adapted for application to the surface of a transparent solid material comprising a refined paraffin wax having a melting point within the range of about 123° F. to about 149° F. a polyamide resin having an average molecular weight within the range of about 3000 to about 6000 having a softening point within the range of about 105° C. to about 115° C. and oleyl amide.

5. A water-repellant composition in the form of a solid, homogeneous mixture adapted for application to the surface of a transparent, solid material comprising a refined hydrocarbon wax in amount within the range of about 20 percent to about 50 percent, by weight, a polyamide resin having an average molecular weight within the range of about 3000 to about 6000 in amount within the range of about 20 percent to about 50 percent, by weight, and a long-chain aliphatic amide having an aliphatic group containing from about 9 to about 32 carbon atoms in amount within the range of about 20 percent to about 50 percent, by weight.

6. A water-repellant composition in the form of a solid, homogeneous mixture adapted for application to the surface of a transparent, solid material comprising a refined paraffin wax having a melting point within the range of about 125° F. to about 127° F., a polyamide resin formed by the condensation of dilinoleic acid with ethylene diamine and having a softening point within the range of about 105° C. to about 115° C. and oleyl amide.

7. A water-repellant composition in the form of a solid, homogeneous mixture adapted for application to the surface of a transparent, solid material comprising a refined paraffin wax having a melting point within the range of about 125° F. to about 127° F., a polyamide resin formed by the condensation of dilinoleic acid with ethylene diamine and having a softening point within the range of about 105° C to about 115° C. and oleyl amide, each of the said ingredients being present in the mixture in amount within the range of about 30 to about 35 percent, by weight.

8. A method for the application of a water-repellant film to the surface of a transfer solid material which comprises coating the said surface with a bonding composition comprising a finely divided solid material and a compound selected from the group consisting of dialkyl dialkoxy silane and monoalkyl trialkoxy silane, the alkyl groups of which contain at least three carbon atoms and not more than thirty-two carbon atoms, polishing the said surface in the presence of atmospheric moisture, to remove therefrom all the finely divided solid material deposited by the said composition while leaving on the said surface the product of the hydrolysis of the said silane which contains combined silicon, spreading over the treated surface a layer of a solid, homogeneous mixture of a hydrocarbon wax, a polyamide resin having an average molecular weight within the range of about 3000 to about 6000 and a long chain aliphatic amide having an aliphatic group containing from about 9 to about 32 carbon atoms, and polishing the said layer to a uniform, clear film.

9. A method for the application of a water-repellant film to the surface of a transparent solid material which comprises coating the surface with a bonding composition comprising amyl triethoxy silane, carbon black and a volatile aliphatic hydrocarbon solvent, polishing the said surface in the presence of atmospheric moisture to remove therefrom all the carbon black deposited by the said composition while permitting the evaporation of the volatile aliphatic hydrocarbon solvent and of the ethyl alcohol formed by the hydrolysis of the said silane while leaving on the surface a film of the product of the hydrolysis of the said silane which contains combined silicon, spreading over the treated surface a layer of a solid, homogeneous mixture of refined paraffin wax, a polyamide resin having an average molecular weight within the range of about 3000 to about 6000 formed by the condensation of dilinoleic acid and oleyl amide, and polishing the said layer to a uniform, clear film.

10. A transparent solid material having a surface coated with a clear film which is non-wettable by water and which comprises a hydrocarbon wax, a polyamide resin having an average molecular weight within the range of about 3000 to about 6000 and a long-chain aliphatic amide having an aliphatic group containing from about 9 to about 32 carbon atoms which is bonded to the said surface by a thin, intermediate film of the silicon-containing product of the hydrolysis of a compound selected from the group consisting of dialkyl dialkoxy silane and monoalkyl trialkoxy silane which have alkyl groups which contain at least three carbon atoms and not more than thirty-two carbon atoms.

11. Transparent glass having an optical surface coated with a clear film which is non-wettable by water and which comprises refined paraffin wax, a polyamide resin produced by the condensation of dilinoleic acid with ethylene diamine having a molecular weight within the range of about 3000 to about 6000 and oleyl amide which is bonded to the said surface by a thin intermediate film of the silicon-containing product of the hydrolysis of amyl triethoxy silane.

12. A windshield having a surface coated with a clear film which is non-wettable by water and which comprises refined paraffin wax, a polyamide resin produced by the condensation of dilinoleic acid with ethylene diamine having a molecular weight within the range of about 3000 to about 6000 and oleyl amide which is bonded to the said surface by a thin intermediate film of the silicon-containing product of the hydrolysis of amyl triethoxy silane.

References Cited in the file of this patent

UNITED STATES PATENTS

| | | |
|---|---|---|
| 2,390,370 | Hyde | Dec. 4, 1945 |
| 2,442,053 | McGregor | May 25, 1948 |
| 2,469,108 | Fries | May 3, 1949 |
| 2,495,283 | Werntz | Jan. 24, 1950 |
| 2,612,458 | Stedman | Sept. 30, 1952 |
| 2,790,736 | McLaughlin | Apr. 30, 1957 |

FOREIGN PATENTS

| | | |
|---|---|---|
| 585,167 | Great Britain | Jan. 19, 1947 |